INVENTOR.
John David Pfeiffer

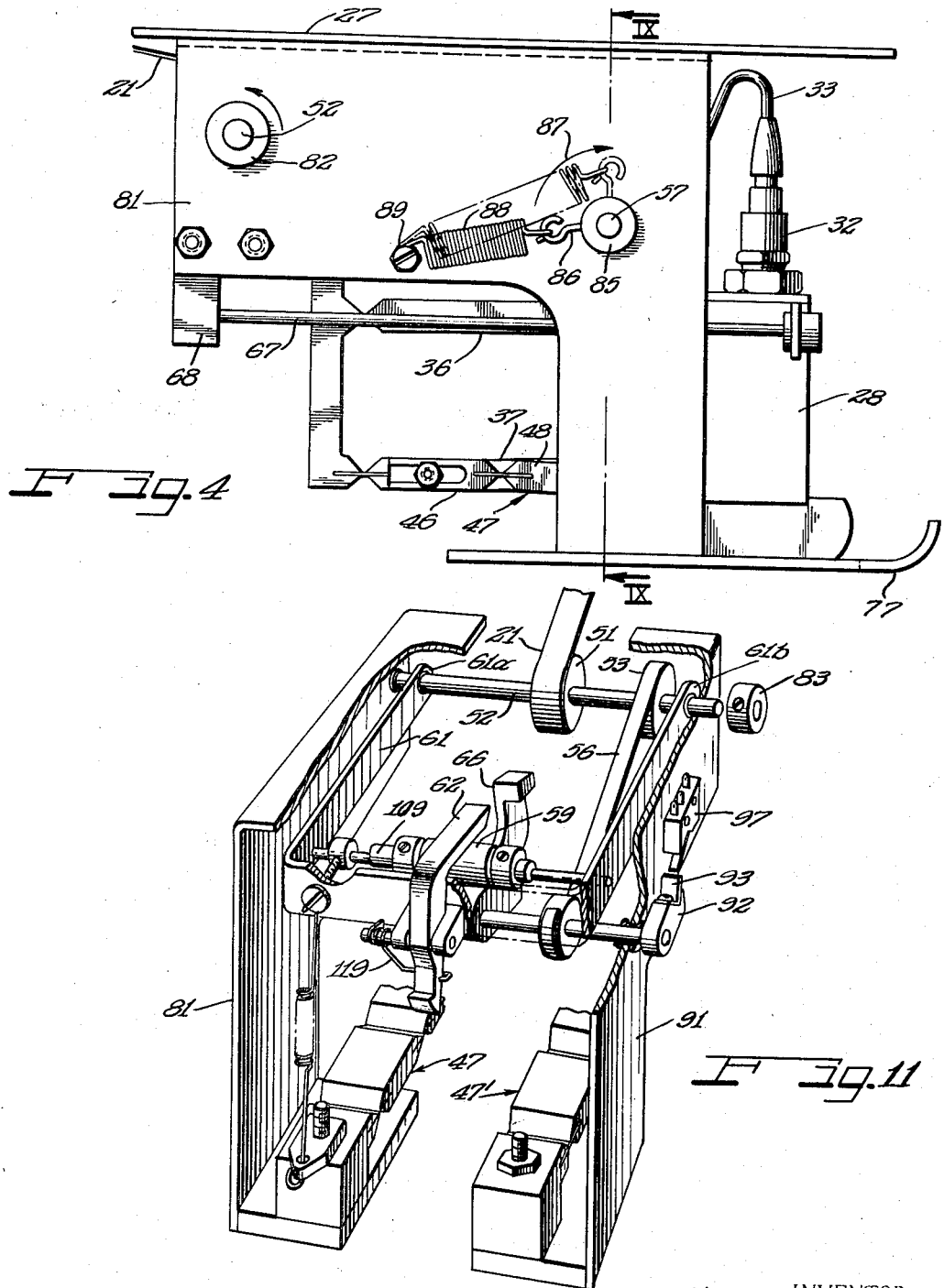

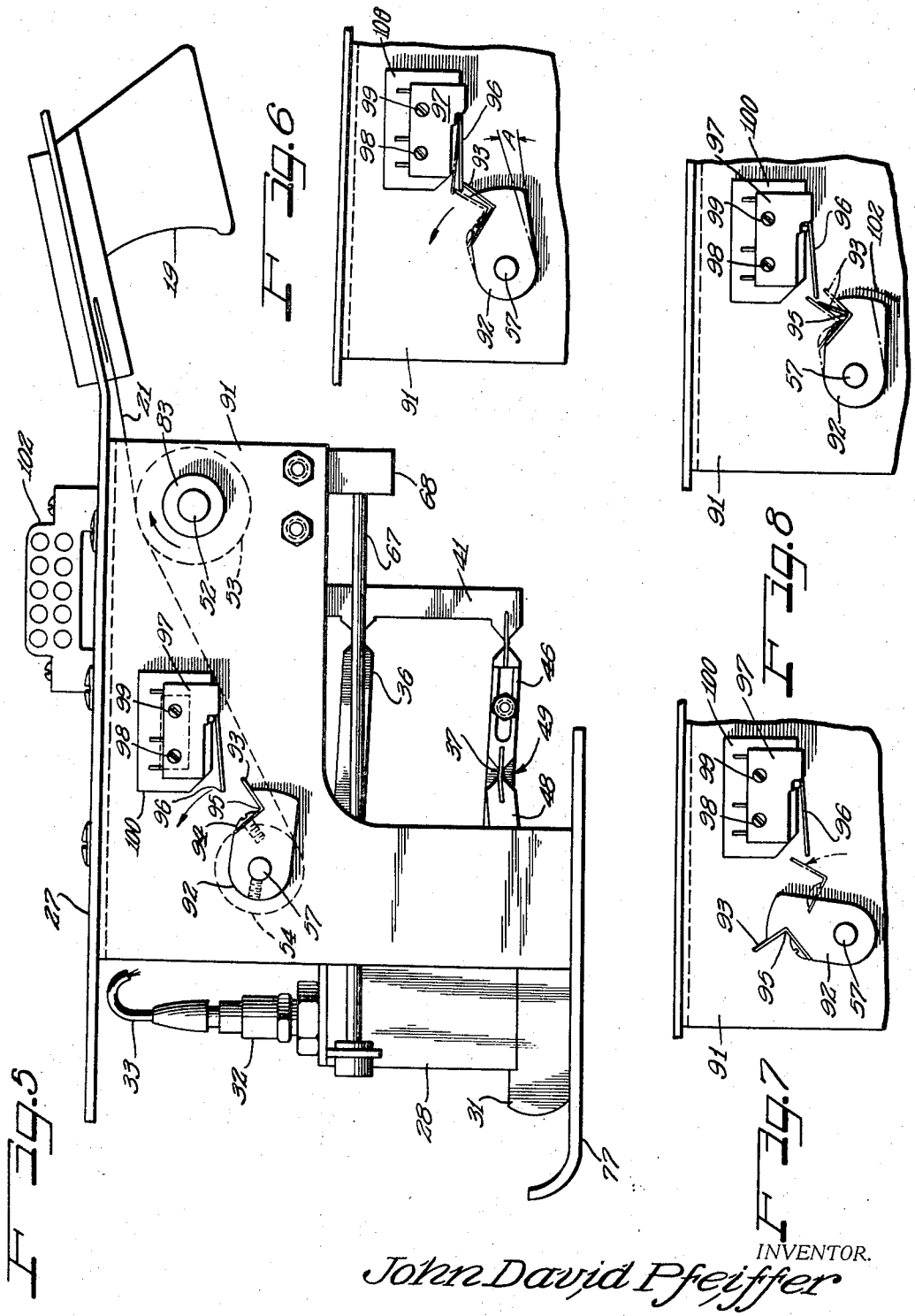

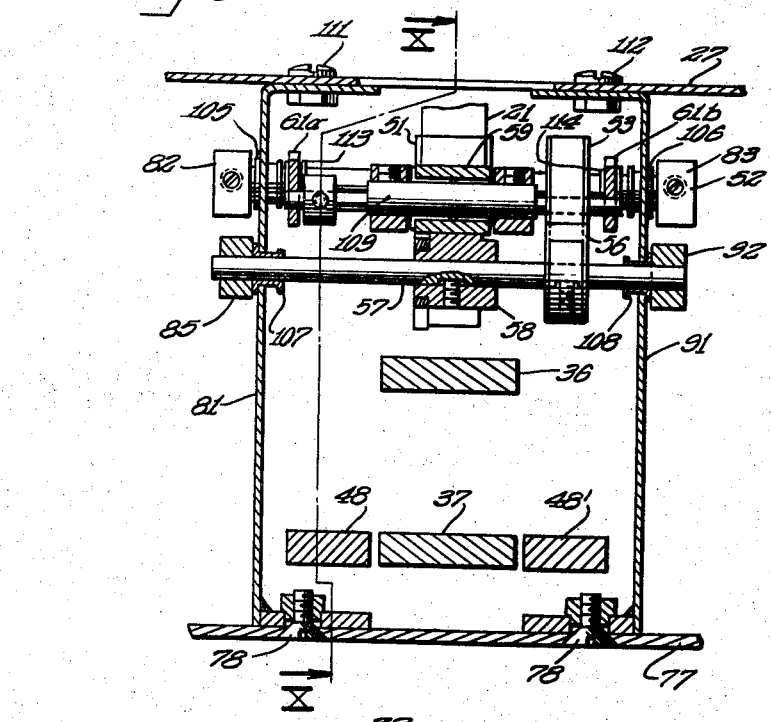
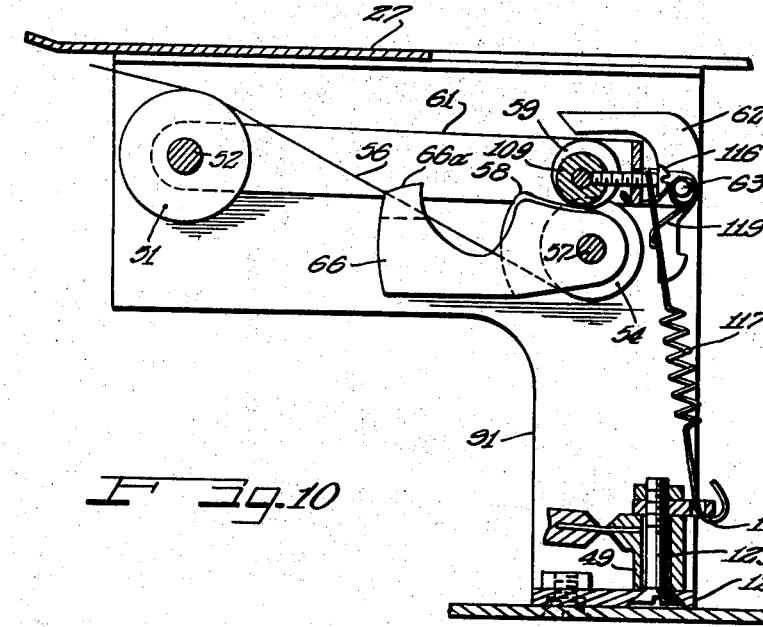

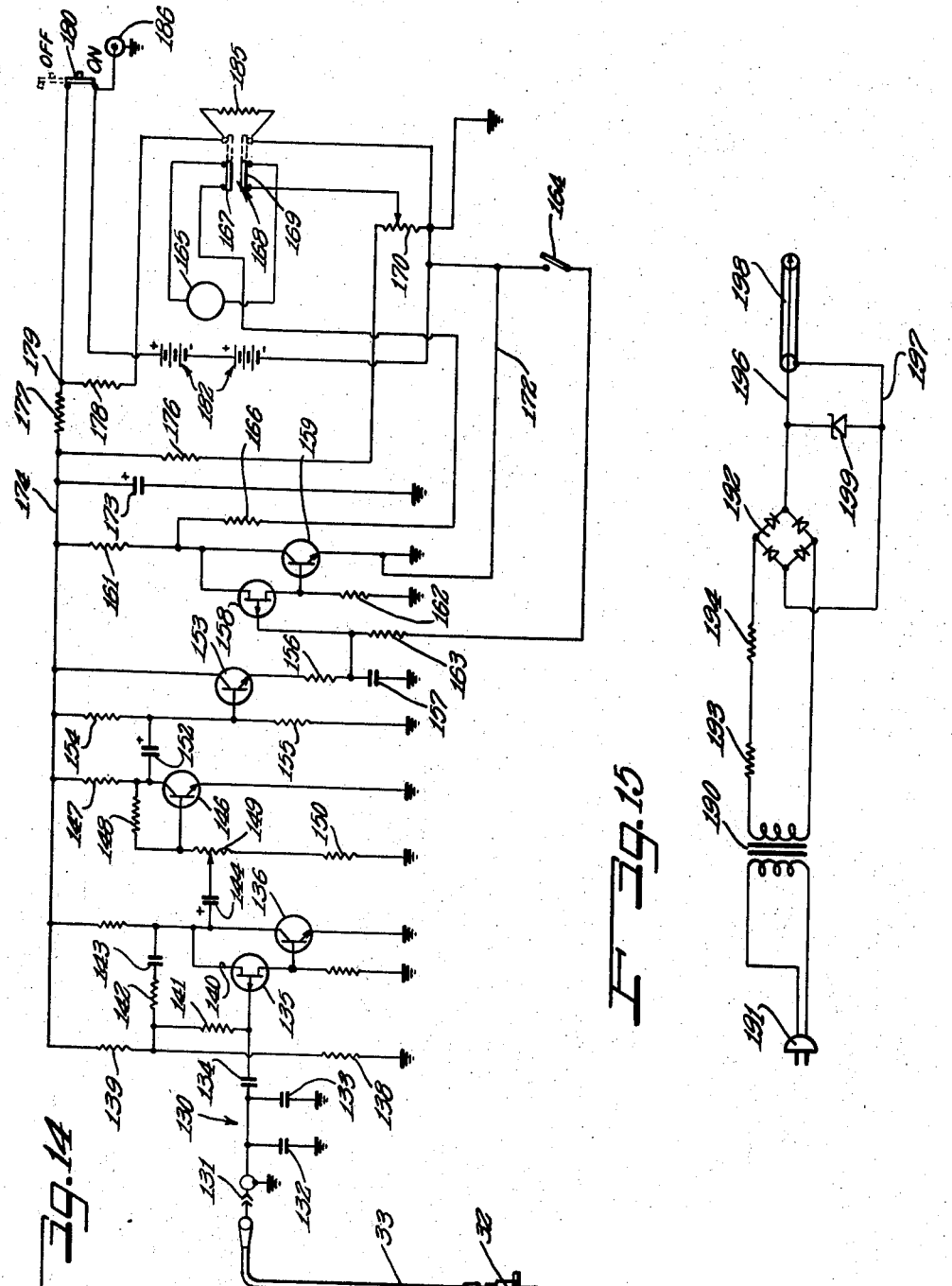

United States Patent Office 3,425,267
Patented Feb. 4, 1969

3,425,267
HARDNESS TESTER
John David Pfeiffer, Downingtown, Pa., assignor to Beloit Eastern Corporation, Downingtown, Pa., a corporation of Delaware
Filed Dec. 13, 1965, Ser. No. 513,194
U.S. Cl. 73—78      15 Claims
Int. Cl. G01n 3/30

ABSTRACT OF THE DISCLOSURE

A hardness tester having a mechanism with a fixed portion and a movable portion and a striker connected to the movable portion. A trigger and actuating means are connected to the mechanism to move the striker in a predetermined direction and release means are provided to release the striker at a predetermined point of movement to cause the striker to move with a known kinetic energy in the opposite direction to impinge upon the surface of the material under test. Translating means are provided to develop a signal indicative of the hardness of the material and to record the signal on an indicator.

---

This invention relates generally to an apparatus and method for measuring the relative hardness of materials. Specifically, this invention is directed to an apparatus and method for measuring the relative density of continuous wound rolls of paper, or the like. The relative density of wound rolls is found to have a direct relationship with the tightness between each layer of the wound roll. Therefore, the apparatus and method for measuring relative density is useful to determine the tightness between wound layers of a roll of paper or the like.

Heretofore, one of the widely used devices for measuring wound rolls of paper has been a stick or club, generally made of hardwood and wielded by the hand so as to rap the roll surface. The operator then observes the timber of the sound produced and also to some extent the type of vibrations induced in the club handle from the impact. Often the palm and fingertips of one free hand are held against the roll surface approximately a foot or so from the spot where the roll is to be struck. In so doing, some of the vibrations induced in the paper by striking the roll can be felt, especially the lower frequencies which are difficult to hear.

The club method is quick and simple for determining spots relatively softer or harder than others, but it has no absolute scale of hardness. A remembered sense of tone or feel is hard for a person to carry from one roll to the next. When an operator uses the hardwood club method to test a roll of paper, he may have trouble finding the right words to express what he finds. Furthermore, a second operator may not agree with the judgments of the first.

Also, penetrometer type instruments have been used as an approach to measuring roll hardness numerically but without much success. Generally, these instruments operate on a principle similar to that of a durometer tester, where a spring-loaded penetrator button is pressed down into the material until a large-area reference surface of the device contacts the material surface and stops further travel. The reading of a dial indicator of the durometer tester shows the distance which the penetrator button has carried into the material. To avoid marking or dimpling the material, these instruments must have penetrators with large radius tips. Also, to sample to a great enough depth to minimize the effect of a few loose outer wraps, a high force must be applied to this large button.

A large area reference surface must be used to stop this force at the material surface. Therefore, the instruments quickly move out of the hand-held and hand-applied class into a type requiring mechanical leverage operation. Time affects the readings taken by this type of instrument. The longer the penetrator is held into the material, the softer the hardness reading will become, due to creep and plastic flow which takes place under the penetrator button.

Still another type of penetration instrument has been used to take readings at the ends of paper rolls between the layers. This type of test instrument uses a needle pointed probe. This type of test must be classified as a destructive test because the probes inevitably tear or cut the sheet edges which may lead to the possibility of a web break later. The hardness condition of the very edge of the web is usually so variable due to dry edges, slitter rings, or speed offsets that it seldom correlates with the rest of the roll.

Ultrasonic testing has been considered and even tried to measure roll hardness, but it fails on three counts. At ultrasonic frequencies, the impedance of paper is very close to that of air. Therefore it becomes very difficult to couple the energy from an ultrasonic transducer into a paper roll without most of the energy spilling out into the surrounding air. Secondly, the attenuation or percentage of energy lost per distance traveled is very high in paper at these frequencies, and result in little available energy for the return signal. Finally, hopes to find "hard spots" in paper rolls as flaws are found in castings with ultrasound have remained unfulfilled since the paper "hard spots" are usually gradual shifts in wound-in tension and are not nearly as discontinuous as air holes or cracks in castings.

Attempts in addition, have been made to receive and analyze the audio frequency echoes and reverberations caused by an impact to the roll surface. This type of analysis is extremely involved and complicated. One problem is to separate the signal from extraneous room noises and, if the roll is turning, from internal creaking noises and noises from winder drums. The other problem is to analyze the complicated audio frequency waveform that results under the best of conditions.

The type of testing mentioned above is not to be confused with tests to measure the velocity of sound propagation in paper, which has been used to great advantage in the laboratory to deduce the internal compression between layers of paper on a roll. Sound propagation velocity testing does not involve analyzing the waveform of an echo, it requires measuring the time lapse for the start of a compression wave due to an impact to arrive at one or more specific points on the inside of the roll; or along one of the ends. Still, several calculation steps are required to reduce this data to a measure of hardness, and the process is not suitable for a portable hardness tester.

Rebound testers also have been considered for hardness measurement. However, rebound measures the coefficient of restitution and not the hardness. This instrument uses a test mass of about one pound fired at a considerable velocity against the roll surface. The collision energy is sufficient to damage the paper for about ½" depth. Preliminary reports indicate that the rebound tester has only about one-half the sensitivity which is necessary for detecting hardness changes in one particular grade of paper.

Rebound testers measure the loss of magnitude of momentum of a test mass by measuring the ratio of the rebound height to the original height of drop. The square root of this ratio is known as the coefficient of restitution which is one for a perfectly elastic collision and zero for a perfectly inelastic collision. However, it has been found that rebound is a measurement of hardness of the material property. The two will correlate only for a limited range, holding other properties constant. It is analogous to try to estimate the specific gravity of a liquid by measuring its viscosity. In solid materials it is not necessarily the hardest material that has the highest rebound. For example, in the case of a thick, hard piece of tanned leather, the rebound height may be very low whereas in a mass of natural gum rubber the rebound may approach 100%. In paper testing, any correlation between rebound height and hardness may be upset by the ratio of long to short fibers which go into the composition of the paper, and/or the moisture content of the paper.

Hardness testers have particular utility in the paper making industry for determining the average tightness between layers of a continuous wound roll. If the average tightness is too high, bags or stretch-outs are likely to occur in portions of the paper on the roll. On the other hand, if the average tightness is too low, telescoping, creep wrinkles, and flatsidedness are likely to occur. Therefore it is desirable to provide a device which can accurately and readily determine the relative tightness between layers of paper on a wound roll so that the above-mentioned difficulties can be eliminated.

Therefore, one of the primary objects of the present invention is to provide an apparatus for measuring the relative hardness of materials.

Another object of the present invention is to devise a method of accurately determining the relative hardness of materials.

Another object of the present invention is to provide a hardness tester which is highly portable and hand operated.

Another object of the present invention is to provide a mechanism capable of producing a constantly accelerating linear movement which has a known kinetic energy.

Another object of the present invention is to provide a sensing means including a read-out device to accurately sense the peak negative acceleration of a known mass and to display such peak value on the read-out device.

Still another object of the present invention is to provide a portable hardness tester which will accurately determine the relative hardness of materials even though the hardness tester is not positioned in an exacting relation with respect to the surface of the material being tested.

Another object of the present invention is to provide a hardness tester which can be used to completely check the roll structure of a paper roll from the core to the outer surface, while winding the roll.

A further object of the present invention is to provide a portable hardness tester which provides long periods of reliable and accurate use and which is not substantially effected by decreasing battery power when the battery charge varies between a full charge and a predetermined minimum charge.

Still another object of the present invention is to provide a hardness tester for determining the relative tightness between each layer of paper on a continuous wound roll of paper, or the like.

A still further object of the present invention is to provide a hardness tester which gives an indication of the relative hardness of a material and which indication is indicative of the hardness through a relatively thick portion of the material.

One of the primary features of the present invention is the construction of the mechanism used to derive the constantly accelerated linear movement of the known mass. The mechanism includes a plurality of molded epoxy links which are flexibly connected one to the other by means of polypropylene hinges.

Another feature of the present invention is the use of a circuit arrangement capable of providing a constant readout signal which is indicative of the peak negative acceleration of a known mass.

Still another feature of the present invention resides in the use of a reset switch and actuating means. The reset switch and actuating means set the read-out mechanism of the hardness tester as the trigger thereof is being depressed.

Briefly, the apparatus of the present invention gauges hardness by measuring the peak force generated by the impact of a specially shaped striker traveling with a known energy when the striker comes into contact with the object under test. This indication of hardness agrees exactly with some more subjective types of hardness tests including striking the object under test with a hardwood club or rapping it with the knuckles.

Since the specific amount of force developed in a collision between a striker and a paper roll will depend upon the mass, velocity, and the shape of the contacting surface of the striker, a new set of units is required to match the values of these quantities chosen for use with the apparatus of this invention. By way of example, these units may be called rho's, after the Greek letter $\rho$ associated with mathematical and physical symbols for density which, in many cases, can be considered as a measurement of hardness. An arbitrary number range of the units as shown on a meter face is 0 to 100 and results in readings around 3 to 25 for soft tissue rolls and 70 to 100 for very hard or highly calendered paper grades.

The meter reading of the apparatus is gauged within a time of about one millisecond and correlates completely with subjective "hard" and "soft" judgments based upon the performance of the roll in motion. By way of example, when the device of the present invention is used to measure rubber or other such materials the meter reading is not directly convertible to a durometer or plastometer reading because of the speed at which the measurements are taken, and also because the present device reads to a greater depth.

To obtain a reading on the meter of the hardness tester, one places it on the roll so that a shoe plate associated therewith is tangent to the roll surface on a line running through two viewing slots in the shoe plate. After the hardness tester is aligned, the trigger is pulled with the surface to be tested, a mechanism within the housing of the device is cocked by pulling the trigger, and any earlier reading remaining on the meter is removed by energization of a special circuit. At the end of the trigger travel, the mechanism is tripped and a light blow is delivered to the surface of a roll. The peak force of this blow is gaged electronically by suitable transducer means and appears immediately as a meter reading. The trigger may then be released. The reading will remain on the meter until the trigger is again pulled, thereby allowing time to record the reading obtained.

The hardness tester may be used on moving rolls of paper at speeds up to 4000 f.p.m. without significant loss of accuracy unless the roll is eccentric or bouncing to such an extent that it is difficult to keep the guide shoe plate in contact with the roll. The ability to read a moving roll can be attributed to three features of the tester. One is that the test mass, or striker, requires no more than approximately 2 milliseconds duration of contact with the roll to take a reading. In this time, at 4000 f.p.m., no more than 1.6″ of paper will have moved past. Secondly, a unique straight-line linkage guiding the test mass keeps it traveling perpendicularly to the roll surface so that components of motion of the roll do not add extraneous forces to the impact. Finally, all hinges used for movement of the test mass suspension are made of polypropylene plastic, which allows very low frictional motion while withstanding thrust forces applied by the moving paper, yet without backlash or other mechanical noises that could upset the delicate electronic transducer pickup.

The electronic circuits of the hardness tester are operated from rechargeable nickel-cadmium batteries which will power the device for approximately 40 hours of continuous operation from a single charge. The batteries may be recharged an indefinite number of times through a quick-contact fitting on a charger which may be included with the hardness tester. The charger operates from 115 volt A.C. power and contains a limiting device to prevent any possibility of overcharging the batteries. The hardness tester may be connected continually to the charger when not in use to assure starting with a full battery charge.

Three operating controls for the electronic circuit and the recharge connection are located in a stainless steel plate just forward of the trigger area. These controls are: an off-on switch for the batteries, easily reached by the trigger finger to turn off the tester as it is set down; a test-operate switch on the opposite side of the trigger. In the test position, this switch allows the meter movement to act as a voltmeter to read battery voltage in terms of percentage of full charge voltage and a control for adjusting the zero position of the hardness meter. The control adjustment required is only used occasionally if the battery voltage has changed a considerable amount.

Other features of the electronic circuit include stabilization against calibration drift due to ambient temperature changes, provision for calibration adjustment to laboratory standards so that the scale on each meter of a plurality of hardness testers agree with each other, and fully shielded circuitry using all silicon transistors secured to the highest quality glass-melamine printed circuit board material.

The case of the hardness tester is molded of high impact strength plastic and the linear movement or striker mechanism is designed to withstand hard usage. The metal element which makes contact with the paper surface is chosen to be non-marking and to have high wear resistance. However, it must be pointed out that in-motion testing of some coated papers should be limited since any type of rubbing friction may cause streaks in the coating of the paper.

These and other objects and features will be more fully realized by the novel structure of this invention, and a better understanding will be had from the following detailed description when taken in conjunction with the accompanying drawings in which:

FIGURE 4 is a side elevational view showing the construction of a side plate within the cabinet housing of FIGURE 1;

FIGURE 5 is a side elevational view showing the construction of the opposite side plate shown in FIGURE 4;

FIGURE 6 is a detail showing of a switch actuating assembly mounted on the side plate shown in FIGURE 5;

FIGURE 7 shows the switch actuating assembly of FIGURE 6 in an actuated position;

FIGURE 8 shows the switch actuating assembly of FIGURE 6 returning to its normal deactuated position;

FIGURE 9 is an elevated sectional view taken along the line IX—IX of FIGURE 4;

FIGURE 10 is an elevated sectional view taken along line X—X of FIGURE 9;

FIGURE 11 is a perspective view of portions of the mechanism within the lower portion of the cabinet housing shown in FIGURE 1;

FIGURE 14 is a schematic wiring diagram showing the preferred circuit arrangement for sensing the peak negative accelerations of a suitable transducer device; and FIGURE 15 is a schematic wiring diagram of a suitable battery charger which is connectable to the hardness tester of the present invention.

It will be understood that like reference numerals throughout the various views of the drawings are intended to designate similar elements or components of the present invention.

Figure 1:
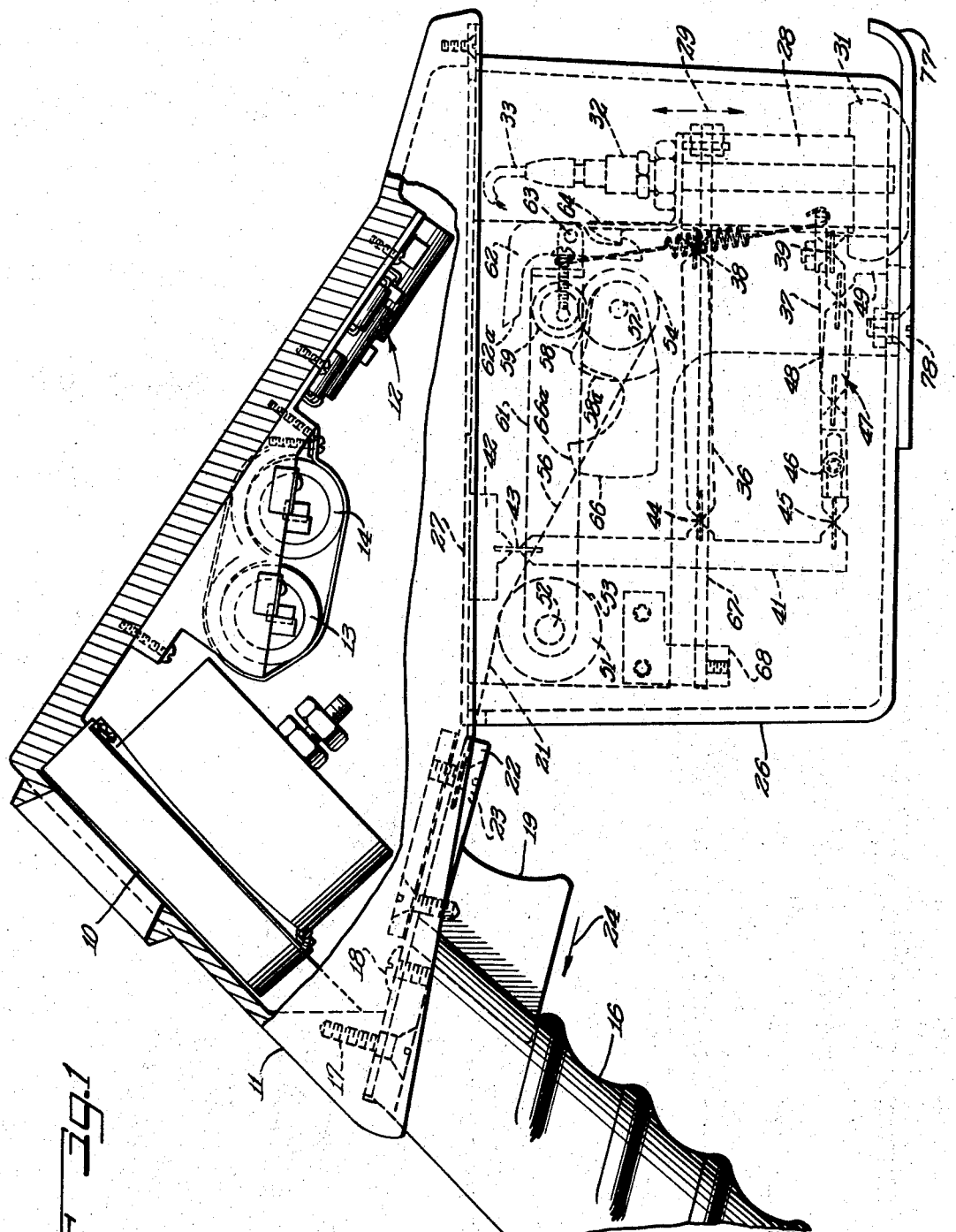
FIGURE 1 is a side elevational view of a hardness tester which has certain parts broken away for clarity and which is constructed in accordance with the principles of this invention.

Referring to FIGURE 1, the hardness tester is provided with a voltmeter 10 which is mounted in an upper case 11, which forms a part of the hardness tester housing. Also secured within the upper case 11 are the electronic components, which are indicated generally by reference numeral 12. A pair of nickel cadmium batteries 13 and 14 are also secured within the upper case 11, and are connected in series to provide approximately 25 volts DC for the electronic circuitry of the hardness tester.

The hardness tester is provided with a handle 16, which serves as a hand grip for the operator. The handle 16 is secured to the hardness tester in a suitable manner such as the screws 17 and 18. A trigger 19 is slidably secured to the handle 16. A flexible steel band 21 is secured to an extended portion 22 of the trigger 19 by a screw 23. Therefore, when the trigger 19 is depressed relative to the handle 16 in the direction of arrow 24, the flexible steel band 21 is pulled by the trigger 19 to actuate the mechanism of the hardness tester.

The hardness tester has a lower case 26 which is secured to the upper case 11 by suitable means. An upper plate 27 may be secured intermediate the upper case 11 and the lower case 26 to provide a main supporting member for the handle 16 and the slidable trigger 19. The upper plate 27 also provides support for the mechanism within the lower case 26.

A striker 28 is connected to a special mechanism which provides the striker with substantially linear movement in the direction of the double ended arrow 29. The striker 28 has a specially shaped striker head 31. The striker head 31 passes through an opening in the bottom of the hardness tester so as to strike the surface of the material being tested when the trigger 19 is depressed. Secured to the striker 28 is a transducer element 32 which senses peak forces of acceleration. The transducer element 32 is a piezoelectric device which produces a voltage output signal proportional to the external forces sensed thereby. A lead 33 is connected to the transducer element 32 to deliver the signal pulse to the input circuit of the electronic circuit 12. The lead 33 is preferably a suitable coaxial cable so that minimum losses will occur between the pickup element 32 and the input circuit of the hardness tester.

The striker 28 is connected for movement to a pair of links 36 and 37. The links 36 and 37 are connected to the striker 28 through hinged members 38 and 39, respectively. A link 41 is pendently secured to a boss 42 which, in turn, is secured to the upper plate 27. A hinge member 43 is connected between the link 41 and boss 42. Furthermore, a pair of hinge members 44 and 45 are connected between the pendent link 41 and the links 46 and 47 respectively. Secured to the link 37 is one member 46 of a three member link 47. A second member 48 is connected between the member 46 and a stationary member 49 which is secured to the bottom surface of the case 26. The member 46 of the link 47 is preferably adjustably secured to the link 37 so that the linearity of movement of the striker 28 can be adjusted.

The striker 28, links 36 and 37, and pendent link 41 and boss 42 are preferably a unitary molded assemblage. The striker 28 links 36, 37, 41, and boss 42 preferably of molded epoxy material, and the hinges 38, 39, 43, 44, and 45 are preferably polypropylene hinges which are secured to the links during the molding operation.

The flexible steel band 21 is secured to a pulley 51 which, in turn, is secured to a shaft 52 for rotation therewith. Also secured to the shaft 52 is another pulley 53, which is not seen in FIGURE 1. The pulley 53 is connected to a pulley 54 via a flexible steel band 56. Therefore, when the trigger 19 is depressed thereby rotating pulley 51 about the shaft 52, the pulley 54 will also be rotated about a shaft 57 by virtue of the steel band 56 which is wound about the pulley 53.

As the pulley 54 rotates about shaft 57, a cam 58 is also rotated about the shaft 57. A roller 59 which, in turn, is secured to an arm 61, rolls on the surface of the cam 58 in such a manner as to raise the end of the arm 61. As seen in FIGURE 1, the arm 61 is pivotally secured to the shaft 52. Also secured to the arm 61 is a latch 62 which is pivotable about a pin 63. The latch 62 engages a latch keeper 64 which, in turn, is secured to the striker 28. Therefore, as the arm 61 is raised by the cam 58, the latch 62 will in turn raise the striker 28.

As the pulley 54 continues to rotate, the roller 59 will continue to follow the curvature of cam 58 to raise the striker 28. However, the cam 58 is provided with a contoured surface 58a which allows the roller 59 to continue to roll without further raising the striker 28. Therefore, the maximum altitude to which the striker 28 is raised is determined by the distance the surface 58a is displaced from the shaft 57. Furthermore, the contoured surface 58a allows the striker 28 to become stabilized before it is released to obtain a hardness reading.

When the striker 28 is at the top of its upward travel, the latch 62 is released by an extended finger 66 which is secured to the shaft 57 for rotation therewith. The finger 66 is contoured to fit around the roller 59. Therefore, when the portion 66a of the finger 66 engages the end 62a of the latch 62, the latch 62 will pivot about the pin 63 and disengage the latch keeper 64. This action will cause the striker 28 to move downwardly in the direction of the arrow 29 in substantially a straight line movement.

The primary portion of the downward force imparted to the striker 28 is obtained by a spring 67. The spring 67 has one end thereof fixedly secured to a boss 68 which, in turn, is secured to a suitable supporting frame within the lower case 26. The other end of the spring 67 is secured to the striker 28. The spring 67 functions substantially as a leaf spring. That is, when the striker 28 is raised the spring 67 is flexed between the ends thereof. Therefore, when the striker 28 is released at the top of its travel, the spring 67 will force the striker 28 downwardly for impact with the surface being tested. It will be understood, that the mass of the striker 28 and the forces applied thereto will be of known quantities. Therefore, when the striker 28 strikes the surface of the material being tested with a known kinetic energy, the output signal from the transducer element 32 can be interpolated in terms of maximum negative acceleration.

Figure 2:
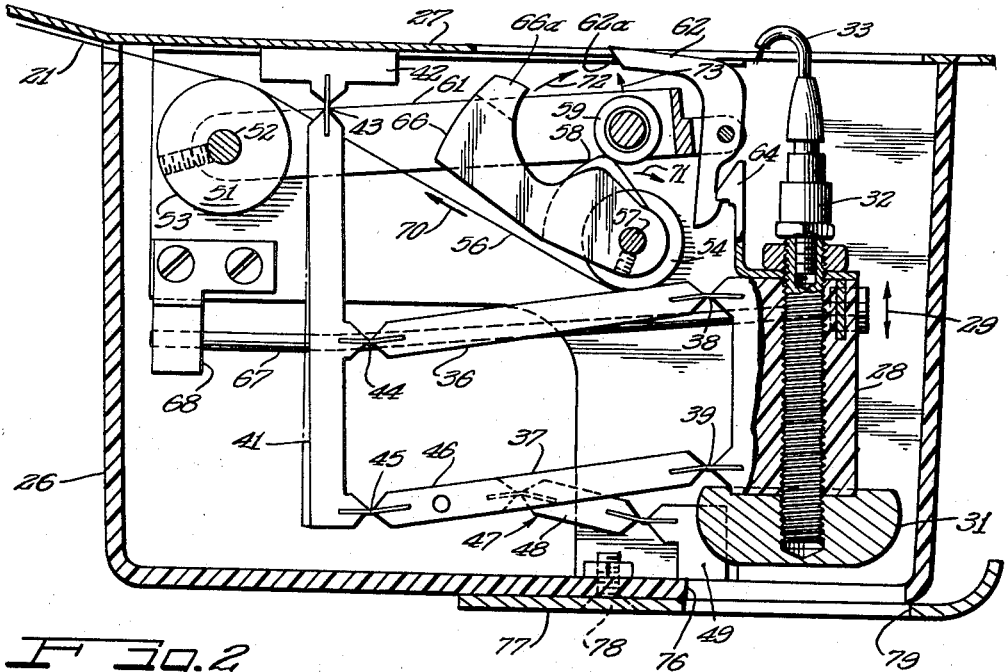
FIGURE 2 is a side elevational sectional view through the lower portion of the cabinet housing shown in FIGURE 1 and shows the relative motion of certain parts as the trigger of the hardness tester is being pulled.
Figure 3:
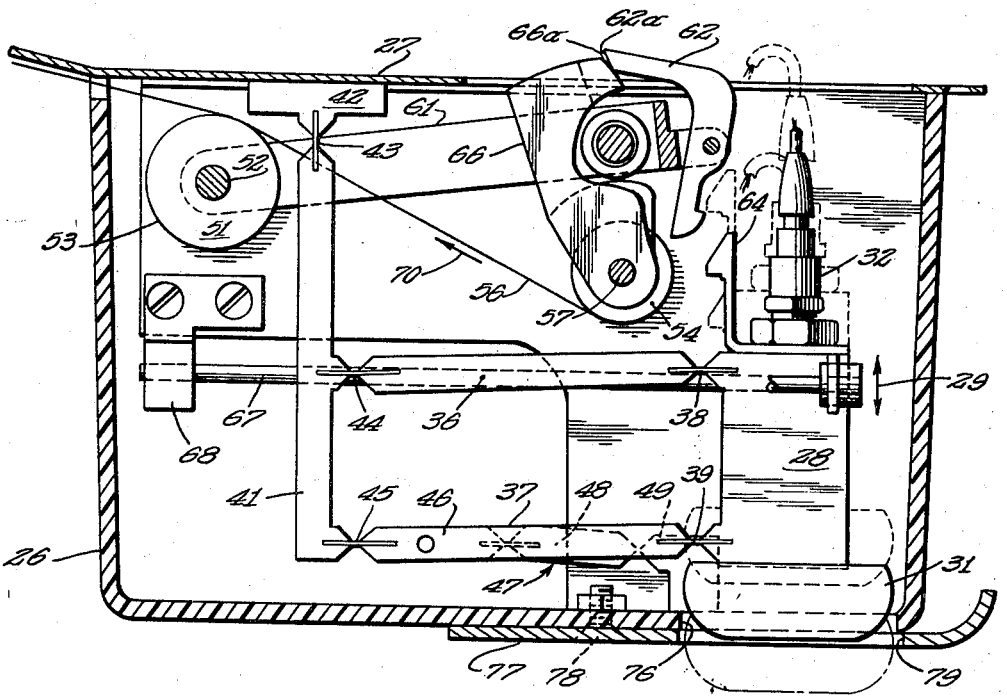
FIGURE 3 is a side elevational sectional view through the lower portion of the cabinet housing shown in FIGURE 1 showing the relative motion of certain parts to release the striker member therein.

For a better understanding of the operation of the release mechanism and of the link arrangement for linear motion, reference is now had to FIGURES 2 and 3. As mentioned hereinabove, when the trigger 19 is depressed the shaft 57 rotates by virtue of movement of the steel band 56 in the direction of arrow 70. This causes the cam 58 to move in an angular direction as indicated by arrow 71. Since the finger 66 is also connected to the shaft 57, it moves in an angular direction indicated by arrow 72. Furthermore, the roller 59 engaging the cam 58 causes the arm 61 to move arcuately upwardly as indicated by the arrow 73. Therefore, it can be seen that this chain of events causes the striker 28 to be lifted in the direction of the arrow 29.

The striker 28, pendent link 41, and links 36 and 37 form the sides of a parallelogram. The three member link 47 has one end thereof secured to the link 37 and the other end thereof secured to the stationary member 49. The three member link 47 maintains the pendent link 41 in substantially a constant position hanging downwardly from the boss 42. Since the striker 28 is the opposite side of the link 41 of the parallelogram, the striker 28 is maintained substantially in parallel alignment with the pendent link 41. This action causes the striker 28 to move in substantially a straight line toward the surface of the material being tested.

As seen in FIGURE 3, the striker head 31 passes through an aperture 76 in the bottom of the case 26. A shoe plate 77 is secured to the bottom of the case 26 by a plurality of screws 78. The shoe plate 77 has an opening therein 79 which is in alignment with the opening 76. The shoe plate 77 extends from both sides of the hardness tester. An aperture is placed on each side of the extended portion of the sole plate to facilitate alignment of the hardness tester upon the rounded surface of a roll.

As seen in FIGURE 4 is a side elevational view of a supporting side wall 81 which is mounted within the lower case 26. The shaft 52 extends through the side wall 81 and through an opposite side wall (not shown) and is secured thereto by collars 82 and 83. Also extending through the side wall 81 is the shaft 57 which, in turn, extends through an opposite side wall, not shown. The shaft 57 has a collar 85 secured thereto. A hook 86 is secured to the collar 85 and to the shaft 57 for rotation therewith, as indicated by the arrow 87. As mentioned hereinabove, when the trigger 19 is pulled, the shaft 57 rotates a cam which, in turn, raises the striker 28. A return spring 88 is connected to the hook 86 and to a stationary screw 89 mounted on the side wall 81. The spring 88 retracts the shaft 57 to its neutral position when the trigger 19 is released.

As seen in FIGURE 5 is a side elevational view of the left side of the hardness tester showing the side plate 91. A switch actuator 92 is secured to the shaft 57 for rotation therewith. The switch actuator 92 has an L-shaped bracket 93 secured thereto by a screw 94. The bracket 93 is flexible in the region 95 and will cause the bracket 93 to bend when the bracket 93 engages a switch lever 96. An electrical switch 97 is secured to the side wall 91 by a pair of screws 98 and 99. An insulator 100 is placed between the side wall 91 and the switch 97 to prevent the possibility of the terminals of the switch 97 from becoming short circuited against the side wall 91. A connector 102 is secured to the upper plate 27 for receiving the electrical connections of the hardness tester.

The switch 97 is provided to reset the electronic circuitry of the hardness tester when the trigger 19 is depressed. However, the switch 97 should not reset the electronic circuitry of the hardness tester when the switch 19 is released. Therefore, a special switch acutating device must be used.

Referring to FIGURES 6, 7, and 8 a better understanding will be had of the switch actuator 92 and bracket 93. As the trigger 19 is pulled, the switch actuator 92 rotates about the shaft 57 until the bracket 93 engages the actuating lever 96 of the switch 97. The position of the bracket 93 relative to the actuating lever 96 is such that the actuator 92 rotates through an angle A during which time the switch contacts are closed. This allows the electronic circuit of the hardness tester to be placed in readiness for sensing the peak signal from the transducer element 32.

After the bracket 93 passes the switch lever 96, the actuator 92 will continue to rotate as the trigger 19 is being pulled. After the striker 28 has been released to cause an output signal from the transducer element 32,, the trigger 19 is released thereby causing the actuator 92 to rotate in the direction of the arrow 102, FIGURE 8. The actuating lever 96 of the switch 97 is sufficiently rigid to cause the flexible L bracket 93 to bend in the region 95, as seen in FIGURE 8. Therefore, the switch 97 does not reset the electronic circuitry of the hardness tester while the trigger 19 is being released.

FIGURE 9 is a front sectional view of the hardness tester taken through the section IX—IX of FIGURE 4. The shaft 52 is journalled by a pair of bearings 105 and 106 which pass through the side walls 81 and 91 respectively. Similarly, the shaft 57 is journalled by a pair of bearings 107 and 108 which pass through the side walls 81 and 91 respectively. The roller 59 is journalled on an eccentric shaft 109. The eccentric shaft 109 is used for adjustment of the roller 59 for optimum performance of the hardness tester.

Also as seen in FIGURE 9, the three member link 47 consists of two portions on either side of the link 37, as indicated by the portions 48 and 48'.

The side walls 81 and 91 are secured to the upper plate 27 by fasteners 111 and 112. Furthermore, the side walls 81 and 91 are secured to the shoe plate 77 by fasteners 78, as mentioned hereinabove. Therefore, the assemblage of side walls 81 and 91 and the upper and lower plates 27 and 77 form a rigid housing for the mechanism of the hardness tester. In the preferred embodiment of the present invention, the side walls 81 and 91 are shown carried within the lower case 26. However this is not to be construed in a limiting sense. The side walls 81 and 91 may form the outer wall surfaces of a lower case if desired.

As seen in FIGURES 1, 2 and 3 the arm 61 is a U-shaped member having the extended leg portions thereof journalled about the shaft 52. Therefore, as seen in FIGURE 9, the extended leg portions 61a and 61b are pivoted on the shaft 52. The extended leg portion 61a is pivoted on the bearing 113, while the extended leg portion 61b is pivoted on the bearing 114. The bearings 105 and 106 contacting the bearings 113 and 114 prevent the etxended leg portions 61a and 61b of the arm 61 from shifting axially on the shaft 52.

As seen in FIGURE 10 is a sectional view taken along the line X—X of FIGURE 9. A screw 116 extends through the end of the U-shaped arm 61 and engages the eccentric shaft 109. The screw 116 engages one end of a tension spring 117 which, in turn, has its other end connected to a bracket 118. The tension spring 117 serves to return the arm 61 to its neutral position after the trigger 19 has been released. Furthermore, the spring 117 prevents any back lash between the roller 59 and cam 58.

A hair pin spring 119 is positioned about the pin 63 and is used to bias the lash 62 in a direction to engage the latch keeper 64, of FIGURE 1.

The stationary member 49 of the three member link 47 is secured to the lower portion 121 of the side wall 91 by a nut 122 and a bolt 123. The nut and bolt 122 and 123 also hold the bracket 118 in a predetermined position to engage the end of the spring 117.

As shown in FIGURE 11 is a perspective view of the side walls 81 and 91, and the mechanism of the hardness tester carried therebetween. The eccentric shaft 109 has the ends thereof secured to the extended leg portions of the arm 61. Therefore, as the roller 59 is urged upwardly by the cam 58, so also is the arm 61 raised upwardly about the shaft 52. As mentioned hereinabove, the upward motion of the arm 61 lifts the latch 62 which, in turn, raises the striker 28 to a predetermined position. Upon reaching the predetermined position, the finger 66 releases the latch 62 thereby causing the striker 28 to strike against the surface of the material being tested with a known kinetic energy.

Figure 12:
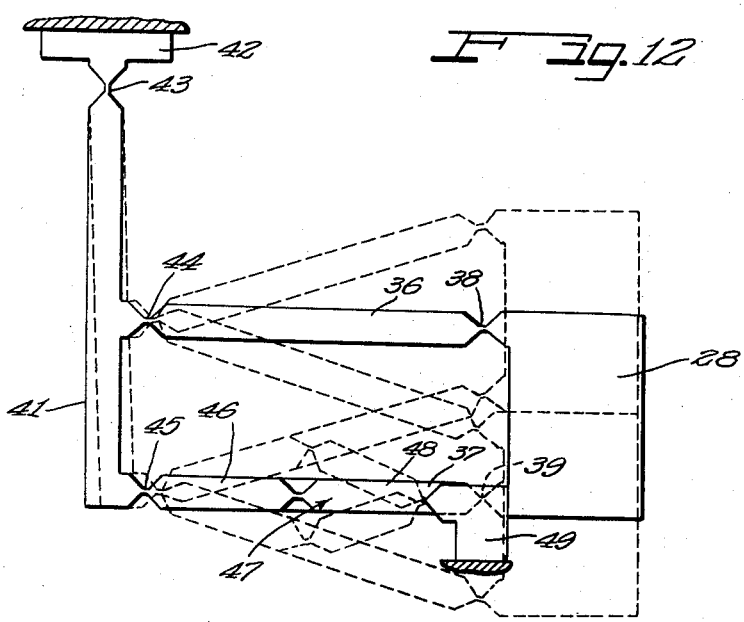
FIGURE 12 is a diagrammatical representation which shows a method of obtaining substantially linear motion of a pivotally mounted member.

For a better understanding of the link mechanism which is used to derive the substantially straight aligned movement of the striker 28, reference is now made to FIGURE 12. The lower end of the pendent link 41 is secured to the link 37 for flexible movement relative thereto by the hinge 45. Similarly, the link 36 is secured to an intermediate portion of the pendent link 41 by the hinge 44. As the striker 28 is moved above or below its neutral position, shown in solid lines, the pendent link 41 tends to move about the hinges 43. However, the three member link 47 which is secured between the lower link 37 and the stationary member 49 prevents the pendent link 41 from moving an appreciable amount. Therefore, the movement of the striker 28 is maintained in substantially a straight line parallel to the pendent link 41. It would be understood however that the straight line movement of the striker 41 is obtainable only within certain limits of movement of the links 36 and 37. If the links 36 and 37 are allowed to pivot a substantial amount about the hinges 44 and 45 an arcuate component of movement will be sensed by the striker 28. Therefore, by use of the three mmeber link 47, and by limiting the usable range of movement of the striker 28, substantially straight line movement can be generated by the linking arrangement shown in FIGURE 12.

Figure 13:
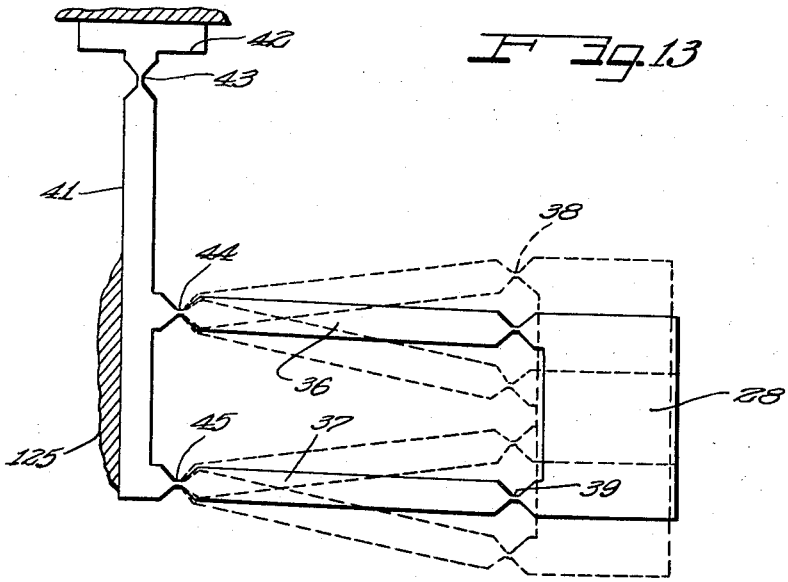
FIGURE 13 is a somewhat diagrammatic representation showing another method of obtaining linear motion of a pivotally mounted member.

A modified linking mechanism is shown in FIGURE 13. The three member link 47 is eliminated, and the pendent link 41 is maintained in a substantialy rigid condition against a wall surface 125. The rigid wall surface 125 serves the same function as the three member link 47 which is to hold the pendent link 41 in a substantially fixed position during the movement of the striker 28.

Although only two embodiments of linking mechanisms have been shown to generate substantially straight line movement, it is not to be construed in a limiting sense. Similar linking mechanisms arranged to form a parallelogram may be used.

Seen in FIGURE 14 is the schematic diagram of the electronic circuitry used in the hardness tester. The pulse generated by the transducer element 32, when the striker 28 collides with the surface of the object under test, is a negative voltage pulse and is indicative of the deceleration of the striker 28 during impact. The negative signal generated by the transducer element 32 is coupled through the coaxial cable 33 to an input circuit 130. The coaxial cable 33 is preferably a low noise coaxial cable which is removably connected to an input jack 131. The input circuit 130 is formed of a pair of capacitors 132 and 133 connected in parallel. The capacitors 132 and 133 are selected to form a total capacitance value which is necessary for temperature and frequency stability of the transducer element 32. By way of example, the total capacitance of capacitors 132 and 133 is 700 picofarads.

The negative pulse developed across the input circuit 130 is delivered through a DC blocking capacitor 134 to the gate of a field effect transistor 135. The transistor 135 works in conjunction with a transistor 136 and together form a constant current source follower. That is, transistor 135 operates as a source follower with constant current regulation by means of the shunt transistor 136.

The bias on the gate of transistor 135 is established by the voltage divider network consisting of resistors 138 and 139. The source element of transistor 135 is designated by reference numeral 140 which is connected to the collector of transistor 136.

The output of transistors 135 and 136 is fed back to the input of transistor 135 through a resistor capacitor combination consisting of resistors 141 and 142 and capacitor 143. The combination of resistors 141 and 142 and capacitor 143 are selected to provide near unity feedback to the input of the transistor 135. In so doing, the feedback signal has the effect of raising the input impedance of the first amplifier stage to about 1000 megohms. Furthermore, the resistor 142 helps to dampen any oscillations which may tend to occur as the circuit of the first amplifier stage seeks its normal operating point after power has been applied thereto.

In the preferred embodiment of the present invention, the first amplifier stage, which consists of transistors 135 and 136, is operated with a voltage gain of approximately .99. Furthermore, the operation of the first amplifier stage is such that the input pulse applied thereto is not inverted in the output thereof. Therefore, a negative pulse is applied through a DC blocking capacitor 144 to the base electrode of a transistor 146.

A plurality of resistors 147, 148, 149, and 150 serve as a voltage divider network to bias the transistor 146 as a conventional amplifier. The resistor 149 is variable and has the wiper arm thereof connected to the capacitor 144. The variable resistor 149 is preferably a 20 turn potentiometer which is used as a gain control for the transistor 146. Resistor 148 also serves as a feedback resistor to stabilize the gain of the transistor 146 against any changes in power supply voltage.

The output signal from transistor 146 is delivered through a DC blocking capacitor 152 to the base of a transistor 153. The transistor 153 is operated as an emitter follower. A pair of resistors 154 and 155 are connected to the base of transistor 153 and serve to bias the transistor 153. The output signal of transistor 153 is developed across an emitter resistor 156 which, in turn, is connected to ground through a capacitor 157. The emitter follower 153 detects the peaks of the pulse applied thereto and applies this peak voltage across capacitor 157.

As mentioned hereinabove, the readout device of the hardness tester provides a continuous reading after the hardness of material has been sampled. Therefore, the short duration pulse derived from the transducer element 32 is amplified and by virtue of the emitter follower 153 and capacitor 157, a substantially continuous voltage level is provided for operation of the continuous readout of the hardness tester. As long as the signal delivered to transistor 153 is in the positive sense, the current through transistor 153 will flow to charge capacitor 157 in a positive direction. When the signal developed by transistor 153 reaches its maximum value, the capacitor 157 will be charged proportionally. However, when the current through transistor 153 tends to decrease the charge of capacitor 157 will remain at the peak value sensed by transistor 153.

The DC level capacitor 157 is delivered to the gate electrode of a field effect transistor 158. A transistor 159 is shunted across the transistor 158 in substantially the same manner as transistors 135 and 136. However, the transistors 158 and 159 are operated as a DC amplifier with no feedback circuit to the gate electrode of transistor 158. Transistor 158 is a source follower and transistor 159 serves to regulate the current drain thereof to a constant value. The arrangement of transistors 158 and 159 tend to minimize the tracking error between the gate voltage and output voltage of transistor 158.

A load resistor 161 is connected to the collector electrode of transistors 158 and 159, and a bias resistor 162 is connected to the base electrode of transistor 159. A resistor 163 has one end thereof connected to the gate electrode of transistor 158 and the other end thereof connected to a switch 164.

The output signal of transistors 158 and 159 is delivered to a voltmeter 165 through a multiplier resistor 166 in series with a sliding contact 167 of a test switch 168. The current through voltmeter 165 is delivered through another slidable contact 169 of the test switch 168 and to a zero adjustment potentiometer 170. The zero adjustment potentiometer is provided to produce an offsetting voltage on the minus terminal of the voltmeter 165 to compensate for the operating bias of the voltmeter circuitry so that the meter will read zero when there is no signal sensed.

Switch 164 is analogous to switch 97, of FIGURE 5. Therefore, to discharge the voltage on capacitor 157 before a new reading is obtained by the hardness tester, a discharge path is provided through the resistor 163 and switch 164 to ground through a line 172. In the preferred embodiment of the present invention, the speed at which capacitor 157 is discharged is approximately $\frac{1}{30}$ of a second.

A capacitor 173 is connected between the positive line 174 and ground and serves to filter transient signals which may occur in the circuitry of the hardness tester. The potentiometer 170 is also connected to the positive line 174 through a fixed resistor 176.

A pair of resistors 177 and 178 are connected to a circuit point 179 which, in turn, is connected to an on-off switch 180. Also connected to the on-off switch 180 is a power supply 182 which has the negative potential thereof connected to ground. As mentioned hereinabove, the power supply 182 preferably consists of a pair of nickel cadmium batteries.

When the test switch 168 is in the position indicated by the dotted lines, the resistor 178 is connected in series with a fixed resistor 185. The resistor 185 is selected to provide a full scale meter reading when the batteries of the power supply are fully charged. A jack 186 is connected to one terminal of the on-off switch 180 and to the positive terminal of the power supply 182. The jack 186 is provided for connection to a suitable battery charger for charging the batteries of the power supply 182. The connection of the battery charger to jack 186 is such that the batteries are charged regardless of the position of switch 180.

As seen in FIGURE 15 is a schematic wiring diagram of a battery charger, which is used in conjunction with the hardness tester of the present invention. The battery charger is provided with a transformer 190 which has its primary winding connected to a source of AC power through a plug 191. The secondary winding transformer 190 is connected to the AC terminals of a bridge rectifier 192. A pair of current limiting resistors 193 and 194 are connected in series between the secondary of transformer 190 and the bridge 192. The DC output of the bridge circuit 192 is developed across a pair of lines 196 and 197 which, in turn, are connected to a suitable cable 198 for connection to the jack 186, of FIGURE 14.

A Zener diode 199 is connected between lines 196 and 197 and serves to regulate the output of the bridge rectifier 192 to approximately 27.5 volts. Although it is not shown, suitable fuse means may be provided in the circuit arrangement of the battery charger shown in FIGURE 15.

In summary, the present invention provides a reliable means for measuring the relative hardness of materials. The striker 28 has a known kinetic energy and is propelled against the surface of the material under test. Carried by the striker is the transducer element 32 which develops a substantially noise free pulse signal. The peak voltage amplitude of the pulse signal is indicative of the maximum negative acceleration with which the striker 28 makes contact with the surface of the material under test. The pulse signal is delivered to an amplifier wherein the signal is amplified and then utilized to develop a direct current signal which has an amplitude proportional to the peak amplitude of the pulse signal. The direct current signal is applied to a suitable readout device, such as the voltmeter 10, to give an indication of the relative hardness of the material being tested. The amplifier circuitry, including the voltmeter 10, is provided with a hold circuit which retains the meter reading until the trigger 19 is depressed again to obtain a new hardness reading, or until the on-off switch 180 is opened.

Furthermore, the present invention provides means for propelling the striker 28 toward the surface of the material under test in substantially straight line motion. This eliminates the possibility of errors caused by an angular component of force which may not register on the meter 10.

Although the present invention is particularly useful in measuring the relative hardness of wound paper rolls, it is not to be construed in a limiting sense. It will be understood that variation and modifications may be effected without departing from the spirit and scope of the novel concepts of this invention.

Other applications include the measurement of hardness of rolls of plastic film, fabrics, rubber-covered rolls, and filled rolls in supercalenders. Flat sheets may also be tested, such as corrugated cardboard.

Furthermore, the shape of the surface of the striker which contacts said material under test may be modified from the basic cylindrical shape shown in the accompanying drawings to other configurations such as a spherical or conical shape to better adapt to the properties of said material being tested.

I claim as my invention:

1. A hardness tester for determining the relative hardness of materials, including:
   a mechanism having a fixed portion and having a movable portion;
   a striker connected to the movable portion of said mechanism;
   a trigger means;
   actuating means connected between said trigger means and the movable portion of said mechanism for moving said striker in a predetermined direction when the trigger is moved;
   release means for releasing said striker at a predetermined point of its movement to cause said striker to move with a known kinetic energy in the opposite direction of said predetermined direction and impinging upon the surface of the material under test;
   an indicator; and
   translating means connected between said striker and said indicator to develop a signal which is indicative of the relative hardness of the material under test when said striker impinges upon the surface of the material and to deliver the signal to said indicator thereby giving an indication of the relative hardness of the material tested.

2. The hardness tester of claim 1 wherein said mechanism is enclosed in a housing formed essentially of an upper case containing said indicator and said translating means, said lower case containing said mechanism and said striker and said actuating means and said release means.

3. The hardness tester of claim 2 wherein said handle is secured to said upper case, said actuating means extending from said lower case to said upper case and secured to said trigger means.

4. The hardness tester of claim 1 wherein said trigger means is slidably connected to said handle.

5. The hardness tester of claim 1 wherein said mechanism is formed essentially of:
   first and second stationary members;
   a first link having two ends and one of the ends thereof pivotally connected to said first stationary member;
   a second link having two ends and one of the ends thereof pivotally connected to the other end of said first link;
   a third link having two ends and one of the ends thereof pivotally connected to said first link intermediate its two ends;
   a movable member pivotally connected to the other end of said second and third links; and
   a fourth link having two ends and one of the ends thereof pivotally connected to said second member and the other end thereof pivotally connected to said second link near said first link so as to restrain the movement of said first link when said movable member is displaced to either side of its neutral position, thereby causing said movable member to move in substantially a straight line.

6. The hardness tester of claim 5 wherein said striker is secured to said movable member for movement therewith.

7. The hardness tester of claim 1 wherein said mechanism is formed essentially of;
   first and second stationary members;
   a first link having two ends and one of the ends thereof pivotally connected to said first stationary member;
   a second link having two ends and one of the ends thereof pivotally connected to the other end of said first link;
   a third link having two ends and one of the ends thereof pivotally connected to said first link intermediate its two ends;
   a movable member pivotally connected to the other ends of said second and third links; and
   means including said second stationary member for restraining the movement of the other end of said first link when said movable member is displaced to either side of its neutral position, thereby causing said movable member to move in substantially a straight line.

8. The hardness tester of claim 1 wherein said striker is shaped in such a manner as not to mark the surface of the material being tested.

9. The hardness tester of claim 1 wherein said actuating means is formed essentially of:
   first and second rotatable shafts mounted in said housing at right angles to said movement of said mechanism;
   first and second pulleys mounted on said first shaft for rotation therewith, and a third pulley mounted on said second shaft for rotation therewith; a cam secured to said second shaft for rotation therewith;
   a first flexible band connected between said trigger and said first pulley on said first shaft to rotate said first shaft and said second pulley when said trigger is depressed;
   a second flexible band connected between said second pulley on said first shaft and said third pulley on said second shaft to rotate said second shaft when said trigger is depressed;
   an arm having one end connected to said first shaft and the other end extended toward said second shaft;
   a roller connected to said arm, the periphery of said roller in contact with said cam so as to roll thereon and move said arm pivotally about said first shaft when said trigger is depressed;
   a latch pivotally connected to said arm in the region of said roller;
      said latch having an extended portion and a recess portion on opposite sides of said pivot point thereof;
   a latch keeper secured to said striker and engageable with the recess portion of said latch to cause said striker to be moved by said arm when the trigger is depressed; and
   a finger secured to said second shaft for rotation therewith when said trigger is depressed;
      said finger positioned on said second shaft so as to engage the extended portion of said latch at a predetermined point of travel of the extended end of said arm as said arm is moved by said roller in contact with said cam as said cam rotates about said second shaft, thereby releasing the engagement between said latch and said latch keeper to allow said striker to move in a direction toward the surface of the material being tested.

10. The hardness tester of claim 9 further including a spring to bias said striker such that when said finger engages the extended portion of said latch to release the engagement between said latch and said latch keeper, the spring will urge the striker toward the surface of the material being tested with a known kinetic energy.

11. The hardness tester of claim 1 further including a spring to bias said striker such that when said striker is released by said release means the spring will urge said striker toward the surface of the material being tested with a known kinetic energy.

12. The hardness tester of claim 1 wherein said translating means includes:
   a transducer secured to said striker for generating a signal having a peak amplitude proportional to the maximum acceleration of said striker when said striker impinges upon the surface of the material being tested;
   amplifier means having an input terminal connected to said transducer for amplifying the signal and delivering the signal to an output circuit point;
   circuit means connected to the output circuit point of said amplifier means for developing a direct current voltage the amplitude of which is proportional to the peak amplitude of the amplified signal; and means for delivering the direct current voltage to said indicator.

13. The hardness tester of claim 1 including connector means for connecting a battery charger to said translating means and wherein said translating means is formed essentially of:
  a transducer connected to said striker for developing a signal having a peak amplitude indicative of the maximum acceleration of said striker when said striker impinges upon the surface of the material being tested;
  an amplifier having an input terminal connectable to said transducer and further having an output circuit point, said amplifier including means for developing a direct current voltage which is proportional to the peak amplitude of the signal developed by said transducer;
  an on-off switch;
  a battery power supply connected to said amplifier through said on-off switch to apply an operating voltage thereto; and
  circuit means including a switch connected between the output circuit point of said amplifier and said indicator, said switch alternately connectable to the output circuit point of said amplifier and to said battery power supply, thereby utilizing said indicator to indicate the relative hardness of materials when said switch is connected to said amplifier and utilizing said indicator to indicate the quantity of charge remaining in said battery power supply, said connector means having a portion electrically connected to said on-off switch so as to charge said battery power supply when said on-off switch is in either of its two positions.

14. The hardness tester of claim 13 including reset means connected to said amplifier and actuated by said trigger for resetting said amplifier, thereby placing said amplifier in condition for receiving another signal from said transducer when said trigger is depressed.

15. The hardness tester of claim 1 including reset means connected to said translating means and actuated by said trigger for resetting said translating means, thereby removing the signal developed by said translating means from said indicator and placing said translating means in condition to develop a subsequent signal when said trigger is depressed.

References Cited

UNITED STATES PATENTS

| 2,737,048 | 3/1956 | Van Erp | 73—79 |
| 2,834,202 | 5/1958 | Cook | 73—81 |

FOREIGN PATENTS 1,001,230  10/1951  France.

RICHARD C. QUEISSER, *Primary Examiner.*

C. I. McCLELLAND, *Assistant Examiner.*